United States Patent [19]

Fehrenbach et al.

[11] Patent Number: 5,501,479
[45] Date of Patent: Mar. 26, 1996

[54] KICKSTAND BUMPER

[76] Inventors: Donald E. Fehrenbach, 4200 M Rd., Escanaba, Mich. 49829; Allan J. Waeghe, 7710 Summit 19.55 Dr., Gladstone, Mich. 49837

[21] Appl. No.: 337,490

[22] Filed: Nov. 8, 1994

[51] Int. Cl.$^6$ .................................................. B62H 1/00
[52] U.S. Cl. ........................ 280/293; 280/301; 248/188.9
[58] Field of Search .................... 280/293, 298, 280/299, 300, 301, 302, 303, 304, 288.4; 248/615, 345.1, 188.9

[56] References Cited

U.S. PATENT DOCUMENTS

| | | | |
|---|---|---|---|
| 1,022,858 | 4/1912 | Markus | 248/188.9 |
| 2,753,586 | 7/1956 | Metz | 16/18 R |
| 3,733,042 | 5/1973 | Jungjohann et al. | 248/181 |
| 3,955,829 | 5/1976 | Bussler | 280/293 X |
| 4,474,387 | 10/1984 | Maranell et al. | 280/293 |
| 4,521,031 | 6/1985 | Huth | 280/293 |
| 4,625,987 | 12/1986 | Marsh | 280/293 |
| 4,819,957 | 4/1989 | Printy | 280/293 |
| 4,986,557 | 1/1991 | Muszynski | 280/298 |
| 5,069,102 | 12/1991 | Wolf | 84/280 |
| 5,257,803 | 11/1993 | Fisher | 248/346 |
| 5,351,981 | 10/1994 | Thomas | 280/301 |

*Primary Examiner*—Kevin T. Hurley
*Attorney, Agent, or Firm*—Richard C. Litman

[57] ABSTRACT

An improved kickstand includes a resilient ball placed over the end of the kickstand leg. The ball has a bore corresponding in diameter to that of the kickstand leg. The ball is pressed onto the leg, with the latter penetrating the bore. Preferably, adhesive is placed within the bore to assist in securing the ball in place. An uncomplicated and inexpensive enlarged foot is thus provided to a kickstand for resisting the tendency of the kickstand leg to penetrate soft ground when bearing a portion of the weight of its associated bicycle or motorcycle. Advantages include the lack of projecting structure or gaps to entangle clothing, possessions, and vegetation when the kickstand is in the stowed position. Also, the enlarged foot requires no assembly when parking the vehicle, nor adjustment to accommodate the degree of inclination of the vehicle when parked.

4 Claims, 1 Drawing Sheet

KICKSTAND BUMPER

BACKGROUND OF THE INVENTION

1. Field of the Invention

The present invention relates to a kickstand for a bicycle or motorcycle. The kickstand has a main shaft or rod terminating in an enlarged bumper for increasing the surface area contacting the ground or equivalent supporting surface. The kickstand thus resists any tendency to penetrate the ground due to the weight of the bicycle or motorcycle.

2. Description of the Prior Art

Supporting a two wheeled vehicle, such as a motorcycle or bicycle in a standing position is usually accomplished by provision of a kickstand. A kickstand comprises a short leg pivotally attached to the vehicle, which can be swung from a stowed position against the vehicle to a deployed position. In the deployed position, the leg projects generally vertically downwardly, its end coming to rest on the ground.

The vehicle is thus balanced on three points. Most such vehicles are relatively tall, and generally linear. Therefore, the triangle defined by contact at the ground is quite narrow. Even a small movement of the vehicle is likely to unbalance the equilibrium of the balance, and the vehicle would likely then topple to the ground.

Normally, this equilibrium, while precarious from the standpoint that it is easily upset, is suitable under most conditions. However, when the kickstand is lowered onto a soft or penetrable surface, such as damp earth, mud, deep grass or other vegetation, the kickstand leg is prone to penetrate the surface. Even slight penetration causes the vehicle to lean sufficiently to upset the balance equilibrium.

This is a problem which has been widely recognized in the prior art. Typical solutions employ a flat plate which is place on the ground, the kickstand leg resting on the plate. This arrangement distributes the weight borne by the kickstand over a much larger area than that provided by the end of the kickstand leg. This approach usually solves the problem.

The structure and novelty of these devices is primarily directed toward retaining the kickstand leg on the plate, and to tethering the plate conveniently to the vehicle. Examples of this approach are seen in U.S. Pat. No. 4,474,387, issued to Melvin C. Maranell et al. on Oct. 2, 1984, U.S. Pat. No. 4,521,031, issued to Robert M. Huth on Jun. 4, 1985, U.S. Pat. No. 4,625,987, issued to Barry I. Marsh on Dec. 2, 1986, U.S. Pat. No. 4,819,957, issued to Richard Printy on Apr. 11, 1989, and U.S. Pat. No. 5,257,803, issued to Ronald W. Fisher on Nov. 2, 1993.

U.S. Pat. No. 4,986,557, issued to Richard S. Muszynski on Jan. 22, 1991, discloses a separate stand for a motorcycle which employs such a plate. The stand further includes a pivotable joint for accommodating different degrees of leaning.

A cushioning foot attachable to the supporting leg of a large musical instrument is shown in U.S. Pat. No. 5,069,102, issued to Wilhelm Wolf on Dec. 3, 1991. The foot includes a rounded point made from a resilient material for protecting a floor surface from being marred by the weight of the instrument, and a clamp for engaging the leg of the instrument. This assembly is considerably more complicated than is the present invention.

Legs terminating in flat plates attached to the leg by ball joints are shown in U.S. Pat. No. 2,753,586, issued to Peter P. Metz on Jul. 10, 1956, and U.S. Pat. No. 3,733,042, issued to Vernon H. Jungjohann et al. on May 15, 1973. The legs terminate in spherical objects penetrated by a peg connecting the sphere to the leg. However, the spheres are part of ball joint assemblies, and thus are surrounded by the socket structure of the joint.

None of the above inventions and patents, taken either singly or in combination, is seen to describe the instant invention as claimed.

SUMMARY OF THE INVENTION

The present invention comprises a spherical member made from a resilient material located at the end of the leg of a kickstand. This construction provides a major advance over prior art inventions, since the enlarged foot of the kickstand leg is now integral to the leg. There is no problem posed by the stowage of a separate part, as is common to most prior art devices.

The relatively complex structure of Wolf's attachment is avoided. Also, there are no crevices, gaps, sharp edges, projections, and other structure to entangle clothing or possessions of the rider, nor environmental hazards such as projecting vegetation, when the kickstand is in the stowed position and the vehicle is moving, as would be possible with all of the cited prior art inventions.

Cost and ease of assembly are greatly improved over all prior art devices known to the applicants.

To practice the invention, a sphere of resilient, deformable material, such as a synthetic resin, is formed to include a bore penetrating to approximately the center. The bore is coated with adhesive, and the sphere is pressed onto the leg of an otherwise conventional kickstand.

No effort of assembly is required, nor adjustment for leveling a flat plate. The radial symmetry inherent to a sphere assures that the improved kickstand is appropriately oriented to the supporting ground at any inclination of the vehicle.

Accordingly, it is a principal object of the invention to provide a kickstand having a leg including an enlarged foot, for resisting penetration into the ground when the weight of the vehicle is parked.

It is another object of the invention to eliminate crevices, gaps, sharp edges, projections, and other structure present in the kickstand leg which could entangle clothing or possessions of the rider, and environmental hazards such as projecting vegetation, when the kickstand is in the stowed position and the vehicle is moving.

It is a further object of the invention to provide an enlarged foot for a kickstand leg which foot is characterized by radial symmetry.

Still another object of the invention is to eliminate assembly and adjustment of an enlarged foot of a kickstand leg.

An additional object of the invention is to fasten securely the enlarged foot to the leg.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
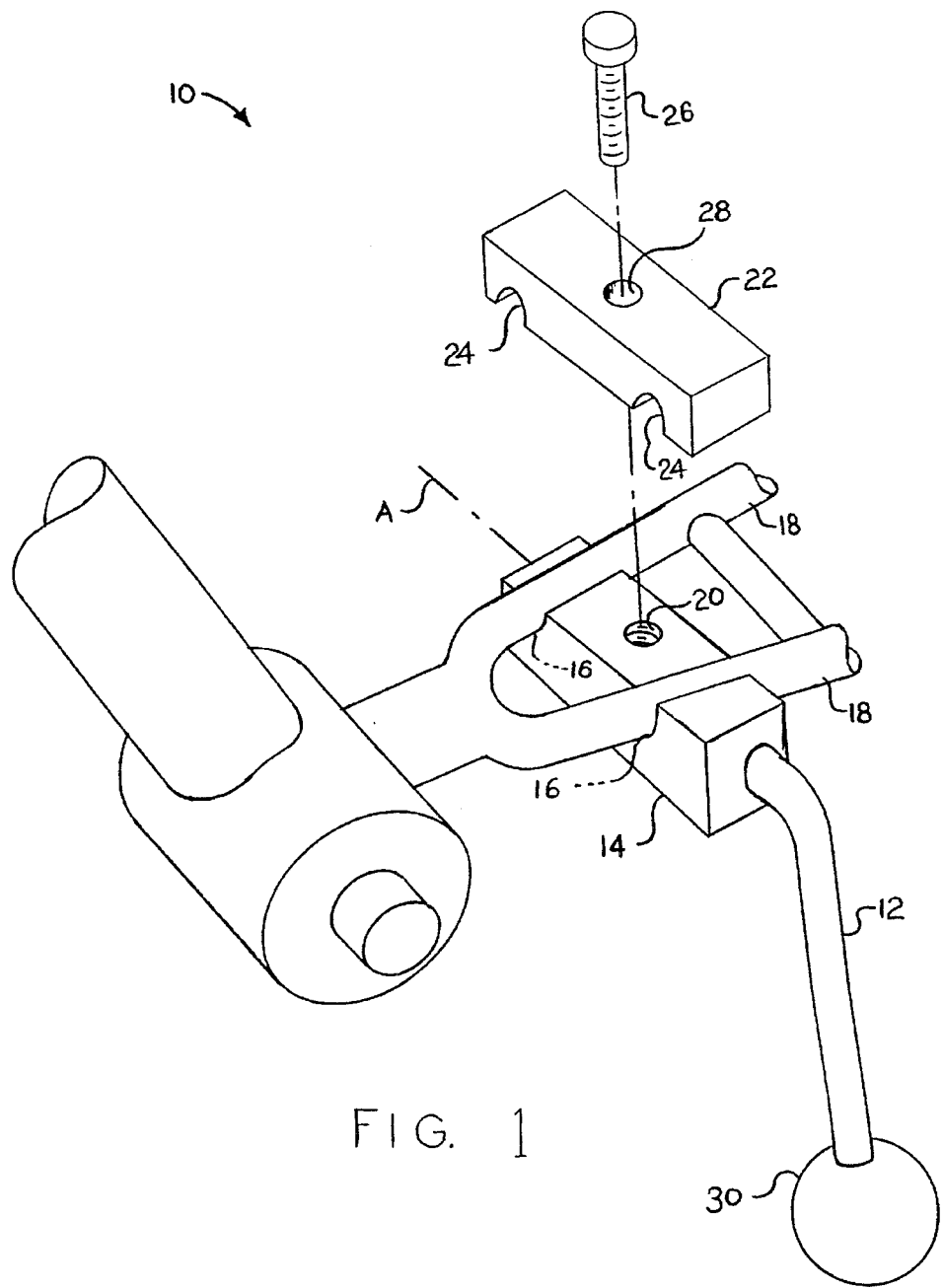
FIG. 1 is an environmental, partially exploded, perspective view of the novel kickstand.

Kickstands are conventionally furnished integrally with two wheeled vehicles such as bicycles and motorcycles. As shown in FIG. 1, wherein a portion of a bicycle (not shown in its entirety) is representative generally of two wheeled vehicles, kickstand 10 is seen to include a leg 12 journaled in a block 14. Block 14 has depressions 16 for receiving frame members 18 of the bicycle, and a threaded hole 20.

Block 14 combines with a second, complementary block 22 to form a clamp attaching to the bicycle. Blocks 14 and 22 surround frame member 18, depressions 16 and 24 preventing slippage of the clamp on frame members 18. The clamping arrangement is secured by a threaded fastener 26 which penetrates hole 28 bored through block 22 to engage threads of hole 20.

Leg 12 terminates in an integral or permanently attached spherical member 30. It is preferred that leg 12 be formed from a suitable strong, rigid material such as metal, and that member 30 be formed from a resilient, deformable material, such as a suitable synthetic resin. Therefore, while it may be possible to form leg 12 and spherical member 30 as a unitary or monolithic part, it is contemplated that they will be fabricated separately and later joined.

Figures 2, 3:
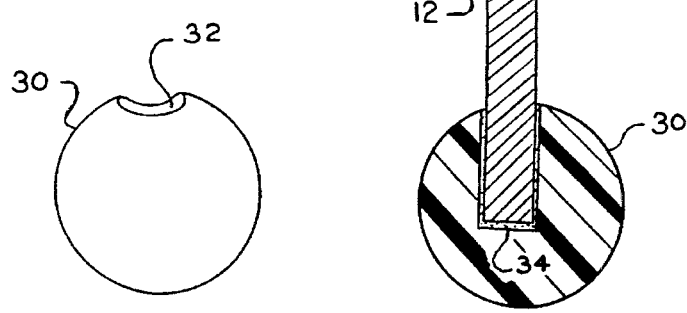
FIG. 2 is a perspective detail view of the enlarged head of the leg of the kickstand.
FIG. 3 is a cross sectional detail view showing the enlarged head installed on its associated leg.

As seen in FIG. 2, member 30 has a bore 32 penetrating thereinto. The diameter of bore 32 is very close to that of leg 12.

FIG. 3 shows the use of adhesive 34 to secure spherical member 30 to leg 12. If member 30 were merely friction fit to leg 12, it would be possible that due to exposure to vibration during use and aging of the synthetic resin over time, member 30 could separate from leg 12 and become lost. Rather than friction fit or interfit these members, adhesive 34 is preferred as being less time consuming and expensive than other methods of securement.

It will be appreciated that kickstands have different configurations, and may operate in different ways. It is not necessary that the kickstand have a clamp for attachment to the vehicle. For example, fastener 26 may be inserted through block 14 from the bottom, and thread to a cooperating threaded hole (not shown) formed in the vehicle frame. It is merely necessary that the kickstand be attachable to the vehicle.

In a similar vein, the leg of the kickstand need not operate in the manner depicted in FIG. 1. FIG. 1 depicts a kickstand wherein leg 12 pivots within block 14 about an axis A in order to move from the deployed position shown to a stowed position wherein leg 12 is proximate and roughly parallel to the nearest frame member 18. It is sufficient that the leg project downwardly, although it is highly preferable that the leg retract to a stowed position to avoid interfering with the ground when the vehicle is in operation. Retraction may be by pivoting, as is performed in the embodiment depicted in FIG. 1, by telescoping, or in any other suitable way.

It is to be understood that the present invention is not limited to the sole embodiment described above, but encompasses any and all embodiments within the scope of the following claims.

We claim:

1. A kickstand comprising:
   a single downwardly projectable leg including,
      a proximal end, and
      a distal end;
   means for anchoring said proximal end of said leg to a two wheeled vehicle;
   a spherical member surrounding said distal end of said leg, said spherical member having a bore penetrating partially thereinto, said distal end of said leg fitting into said bore; and
   an adhesive disposed within said bore, for adhering said leg to said spherical member.

2. The kickstand according to claim 1 wherein said spherical member is composed of a synthetic resin.

3. The kickstand according to claim 1 wherein said spherical member is composed of a resilient, deformable material.

4. A kickstand bumper comprising:
   a spherical member having a radial bore penetrating partially thereinto; and
   an adhesive disposed within said bore, for adhering said spherical member to a leg of a kickstand.

* * * * *